United States Patent [19]

Timmons et al.

[11] Patent Number: 5,379,689

[45] Date of Patent: Jan. 10, 1995

[54] COMPOSITE REPAIR PRESS FOR MANUFACTURING AND REPAIRING A WORKPIECE MADE FROM A COMPOSITE MATERIAL

[75] Inventors: James V. Timmons; Bert C. Jones, III; Paul S. Manicke, all of Albuquerque, N. Mex.

[73] Assignee: General Electric Company, Cincinnati, Ohio

[21] Appl. No.: 100,009

[22] Filed: Jul. 29, 1993

[51] Int. Cl.6 .................... B30B 15/26; B30B 15/34
[52] U.S. Cl. ........................................ 100/43; 100/48; 100/93 P; 100/99; 100/211; 100/231; 100/257; 156/583.3; 156/583.7
[58] Field of Search ................ 100/43, 48, 93 P, 211, 100/231, 257, 38, 99; 156/583.3, 583.6, 583.7

[56] References Cited

U.S. PATENT DOCUMENTS

| | | | |
|---|---|---|---|
| 1,115,013 | 10/1914 | Perkins | 100/231 X |
| 1,913,126 | 6/1933 | McNeill . | |
| 2,332,674 | 10/1943 | Smith | 100/99 X |
| 2,432,215 | 12/1947 | Stocker | 100/93 P X |
| 2,646,105 | 7/1953 | Langer | 156/583.3 X |
| 3,255,476 | 6/1966 | Dawson . | |
| 3,960,069 | 6/1976 | Bowyer | 100/38 |
| 4,193,341 | 3/1980 | Clements et al | 100/231 X |
| 4,317,697 | 3/1987 | McLean | 100/93 P X |
| 4,347,096 | 8/1982 | Schorscher | 100/93 P X |
| 4,365,547 | 12/1982 | McClure, Jr. | 100/43 X |
| 4,408,558 | 10/1983 | Faber et al. | 156/583,3 X |
| 4,700,474 | 10/1987 | Choinski | 29/846 |
| 4,776,919 | 10/1988 | Troutner et al. | 100/93 P X |
| 4,808,253 | 2/1989 | Mimbs | 156/583.3 X |
| 5,231,923 | 8/1993 | Ohta et al. | 100/93 P X |

Primary Examiner—Stephen F. Gerrity
Attorney, Agent, or Firm—Jerome C. Squillaro; Bernard E. Shay

[57] ABSTRACT

A multipurpose, automatic, self-contained device for manufacturing or repairing a workpiece made from a composite material includes a frame having an upper frame member and a lower frame member. A mechanical apparatus for providing a compressive force is mounted to the lower frame member and a lower platen is mounted to a movable member of the apparatus. An upper platen, positioned opposite to the lower platen, is mounted to the upper frame member. At least one heater is associated with at least one of the platens to apply heat to the workpiece and at least one temperature sensor is provided for mounting to the workpiece. The lower platen is moved toward and away from the upper platen by the mechanical apparatus to apply a compressive force to the workpiece disposed between the platens as a function of the temperature sensed from the workpiece and/or according to a predetermined schedule or plan.

10 Claims, 3 Drawing Sheets

COMPOSITE REPAIR PRESS FOR MANUFACTURING AND REPAIRING A WORKPIECE MADE FROM A COMPOSITE MATERIAL

BACKGROUND OF THE INVENTION

The present invention relates to the manufacturing and repair of workpieces made from composite materials and, more particularly, to a device for the repair or manufacturing of a workpiece made from a composite material which applies pressure to the workpiece as a function of the temperature sensed from the workpiece.

Composite materials are gaining wider application and use as a material for aerospace, marine, automotive and other commercial applications. These components made from composite materials often require repair or replacement when in service. Economic considerations and the availability of replacement composite components versus the need to get an aircraft, other vehicle or equipment back in service may dictate whether a damaged composite component will be repaired or replaced.

Composite material components, such as those used in gas turbine engines for aircraft propulsion, are often subject to a replace or repair decision during use and/or routine maintenance or overhaul procedures. These components are often bulky with complex geometries which make them difficult to manipulate and to insert and remove from conventional fixed composite repair equipment or to apply conventional portable equipment. Additionally, conventional composite repair equipment is not universally adaptable to repair all of the various sizes and shapes of components, and the applicability of some repair equipment may be further limited by the severity of the damage to the component and the complexity of the repair required.

Portable equipment and repair methods are available for repairing components made of materials such as polyester, epoxy and hybrid molecular-based fibrous resin systems, but recently higher temperature organic matrix compounds are finding wider application, particularly in the aerospace industry for use in gas turbine engines for aircraft propulsion. These higher temperature organic compounds require higher temperatures for repair than the aforementioned materials and also my require multiple atmospheres of pressure to provide sound cross linking of the resin systems. Such materials my require temperatures up to about 900° Fahrenheit and pressures up to about 250 psi. Additionally, in some repair applications it may be important to confine high temperature and pressure to a localized area of the composite part being repaired even through this part may have a small or a large and unwieldy geometry.

The equipment and techniques used to originally manufacture composite parts are typically massive four-post presses or specialized autoclave vessels and none of these devices lend themselves to portability and easy adaptability to repair work in the field and do not permit limited application of the high heat and pressure to a localized area of the component part under repair.

It is, accordingly, a primary object of the present invention to provide a novel device for manufacturing or repairing a workpiece made from a composite material which is not subject to the foregoing disadvantages.

It is another object of the present invention to provide a novel device for manufacturing or repairing a workpiece made from a composite material wherein heat my be applied to either or both sides of the workpiece and the application of the heat is independently controlled by different programmable controllers which are programmed to apply the heat according to a predetermined schedule.

It is a further object of the present invention to provide a novel device for manufacturing and repairing a workpiece made from a composite material wherein a compressive force is applied to the workpiece as a function of the temperature sensed from the workpiece.

It is yet another object of the present invention to provide a novel device for repairing a workpiece made from a composite material which permits limited application of heat and pressure to a localized area of the workpiece under repair.

These and other objects of the invention, together with features and advantages therefore, will become apparent from the following detailed specification when read with the accompanying drawings in which like reference numerals refer to like elements.

SUMMARY OF THE INVENTION

In accordance with the present invention, a device for manufacturing or repairing a workpiece made from a composite material includes a frame having an upper frame member and a lower frame member and a pair of opposed platens, one respectively coupled to each of the upper and lower frame members. At least one heater to apply heat to the workpiece is disposed on an operating face of at least one of the platens and at least one temperature sensor is mountable to or positioned on the workpiece. At least one of the platens is movable toward and away from the other opposed platen to apply a compressive force to a workpiece disposed between the platens as a function of the temperature sensed from the workpiece during a repair or manufacturing operation and/or according to a predetermined schedule or plan.

A method for making or repairing a workpiece made from a composite material includes the steps of applying heat to at least one side of the workpiece; sensing a temperature of the workpiece; applying a compressive force to the workpiece; and controlling the application of the compressive force according to a predetermined schedule or plan and/or as a function of the temperature sensed from the workpiece.

DETAILED DESCRIPTION OF THE PREFERRED EMBODIMENTS

Figure 1:
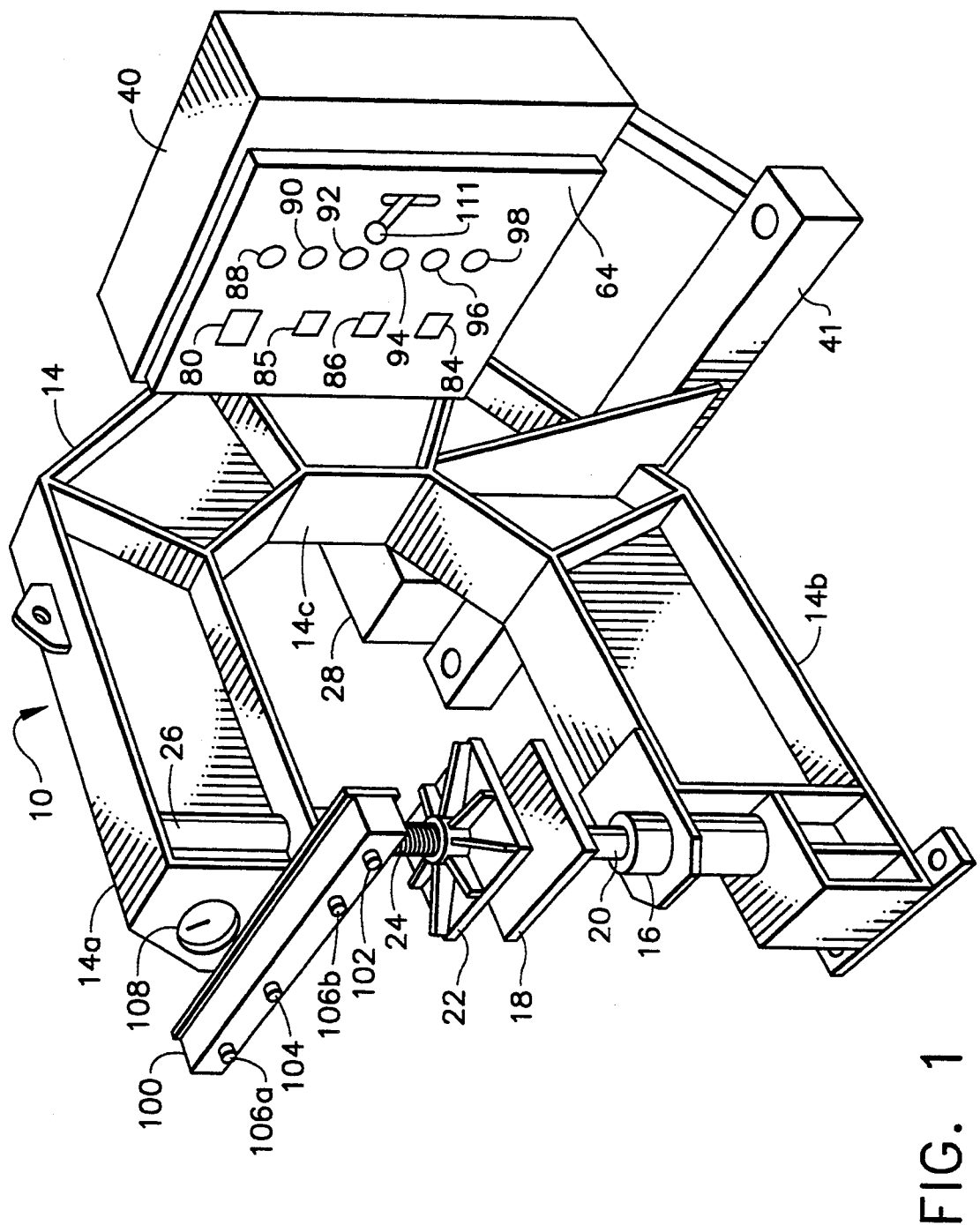
FIG. 1 is a perspective view of the device for manufacturing or repairing a workpiece made from a composite material in accordance with the present invention.

Referring to the figures, a device 10 for manufacturing or repairing a workpiece 12 (only shown in FIG. 2) includes an integrally formed, substantially C-shaped frame 14 or structure having an upper arm 14a and a lower arm 14b. A mechanically operated device for applying a compressive force, such as a hydraulic cylinder 16 or the like, is mounted to the lower arm 14b and a lower platen 18 or platen anvil is mounted to a movable piston 20 of the cylinder 16. The cylinder 16 may be a single acting hydraulic cylinder with a spring return or a double acting hydraulic cylinder, such as an "Enerpac ® Model No. RR-10013", or the like. An upper platen 22 is disposed opposite to the lower platen 18 and is mounted to a screw 24 which is matingly received in a threaded channel 26 formed in the upper arm 14a. The threaded screw 24 or similar arrangement permits adjusting and presetting the height of the upper platen 22 relative to the lower platen 18 prior to a processing operation, when the lower platen 18 is in a non-operative position at a spacing from the upper platen 22. This permits adjustment of the platens to permit the device 10 to accommodate different sizes and shapes of workpieces or components to be inserted between the platens 18 and 22 before a fabrication or repair operation and to be easily removed from between the platens after the operation.

Associated with the cylinder 16 is a reservoir 28 for retaining hydraulic fluid 29 for operation of the cylinder. The hydraulic fluid 29 is pumped from the reservoir 28 by a motor and pump combination 30 to a three-way solenoid valve 32 through a hydraulic line 34. If the cylinder 16 is a double acting cylinder, the solenoid valve 32 is coupled to the cylinder 16 by a first hydraulic line 36 which supplies hydraulic fluid under pressure to the cylinder 16 to cause the piston 20 to advance the lower platen 18 from a non-operative position at a spacing from the upper preset, fixed position platen 22 to an operative position wherein the lower platen 18 in conjunction with the fixed upper platen 22 apply a clamping or compressive force to the workpiece 12 disposed there between. A second hydraulic line 37 is coupled between the solenoid valve 32 and the double acting cylinder 16 to permit hydraulic fluid to drain from one side of the cylinder when the cylinder 16 is operated to provide the compressive force to the workpiece 12; likewise, hydraulic line 36 permits drainage of hydraulic fluid from the other side of the cylinder 16 when hydraulic fluid under pressure is pumped through hydraulic line 37 to cause the cylinder 16 to move the lower platen 18 from its operative position to its non-operative position away from the upper platen 22 to release the workpiece 12. When a predetermined or preset compressive force is reached, the solenoid valve 32 is preferably operated and controlled in association with the motor and pump combination 30 to maintain that predetermined pressure.

The motor and pump combination 30 is preferably a pressure-compensating variable volume pump, such as a Double A ® Model No. AA 85731 package by Air Draulics ®, or the like, and the solenoid valve 32 may be a Vickers ® Model No. DG4V3-2C with a Model No. DGVM-3-10-S subplate.

Operation of the three-way solenoid valve 32 is controlled by a programmable logic controller 38 (FIG. 2B), such as a GE Series 1 controller or the like, which is electrically connected to the valve 32 by electrical conductors 39. The programmable logic controller 38 is mounted in a control cabinet 40 which is mounted to a vertical portion 14c of the C-shaped frame 14 and also to a lateral floor support member 41 (FIG. 1) extending laterally from the base of the frame 14 to provide vertical stability to the device 10 on a floor or other structure upon which the device 10 may reside.

A high pressure limit relief valve 42, such as a Vickers ® Model No. CG-03-F-10 with a CGM-10S-03-10 subplate or the like, is coupled between the hydraulic inlet line 34 of the solenoid valve 32 and an outlet hydraulic line 43 of the solenoid valve 32 to protect the hydraulic system from over pressure and to maintain the predetermined or preset compressive force on the workpiece 12. A servo pilot valve 44, such as Vickers ® Model No. EHST-3-FVF-11 with a No. DGVM-3-10-S subplate or the like, is coupled between the pump 30 and a drain line 46 to balance the pressure between the two sides of the piston 20 within the cylinder 16 to maintain the predetermined pressure. The drain line 46 is also connected to the solenoid valve outlet line 43.

Operation of the servo pilot valve 44 is controlled by a pressure controller 48, such as a Barber Coleman ® Model No. MA P8-04200-100-1-00 or the like, which is electrically coupled to the pilot valve 44 by electrical conductors 45. The pressure controller 48 is also mounted in the control cabinet 40.

An upper heating element or blanket 50 and a lower heating element or blanket 52 may each be respectively disposed on an operating face of the upper platen 22 and the lower platen 18. The heating elements 50 and 52 may be attached to their respective platens 18 and 22 but this is not necessary and more flexibility to repair parts of different sizes and shapes my be achieved by not attaching or mounting the heating elements or blankets 50 and 52 to the platens 18 and 22. Each of the heating elements 50 and 52 includes a resistive-type heating means 53 disposed in an insulative covering 54 to form a conformal heating or thermal blanket. The resistive-type means 53 of the upper heating element 50 is electrically connected to a plug 56, and the resistive heating means 53 of the lower heating element 52 is electrically connected to another plug 58. Each of the plugs 56 and 58 is matingly receivable in respective upper and lower receptacles 60 and 62 (FIGS. 2B) mounted in a face panel 64 of the control cabinet 40. The upper receptacle 60 is electrically connected to an upper temperature controller 68 which is mounted within the control cabinet 40 and the lower receptacle 62 is electrically connected to a lower temperature controller 70 which is also mounted within the control cabinet 40. Therefore, the upper heating element 50 and the lower heating element 52 are easily connectable and disconnectable from their respective temperature controller 68 or 70 by their respective plug and receptacle combinations 56, 60 and 58, 62 to permit use of different sizes and shapes of heating elements or blankets.

The upper temperature controller 68 is also electrically connectable to at least one upper thermocouple 72 which is attachable to an upper surface of the workpiece 12, and the lower temperature controller 70 is connectable to at least one lower thermocouple 74 which is attachable to a lower surface of the workpiece 12. The upper and lower thermocouples 72 and 74 respectively provide closed loop control of the application of heat to the upper and lower surfaces of the workpiece 12 by the heating elements 50 and 52. Heat may be variably applied to either the upper or lower side of the workpiece 12 or to both sides of the workpiece 12 simultaneously, according to a predetermined schedule or plan programmed into the independent temperature controllers 68 and 70 and coordinated or supervised by the logic controller 38, depending upon the requirements for the particular component being repaired or manufactured.

The upper and lower temperature controllers 68 and 70 may be Barber Coleman ® Model No. MAP2-01902-100-100 or the like, and the thermocouples 72 and 74 my be type J thermocouples which are connectable to a type J receptacle (represented by reference numeral 76 in FIGS. 2A and 2B) mounted in a surface of the control cabinet 40. Additional thermocouples may also be attached to the surfaces of the workpiece 12 to facilitate control and monitoring of the repair or fabrication process.

Figure 2A:
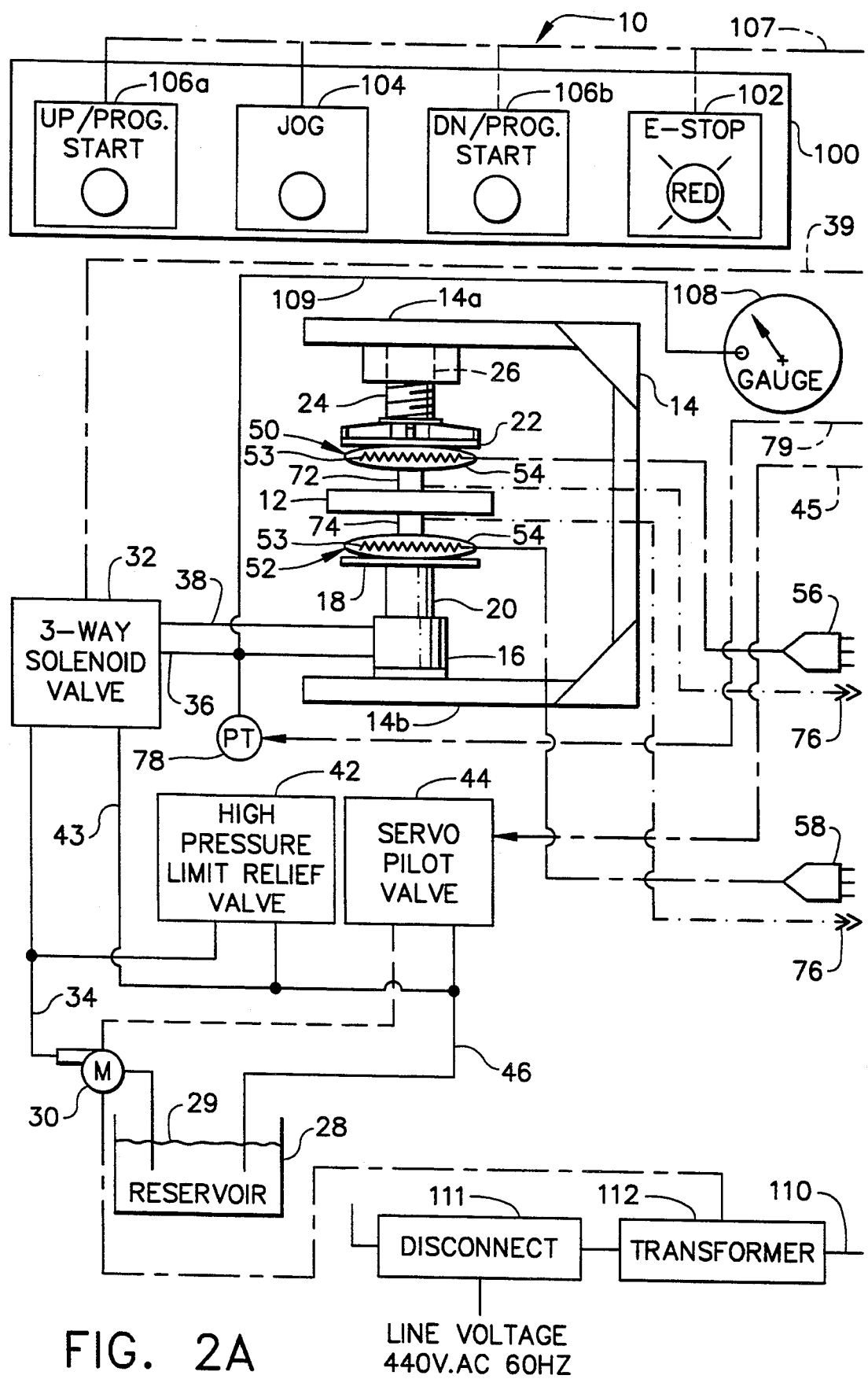
FIGS. 2A and 2B are a schematic diagram of the device of FIG. 1.
Figure 2B:
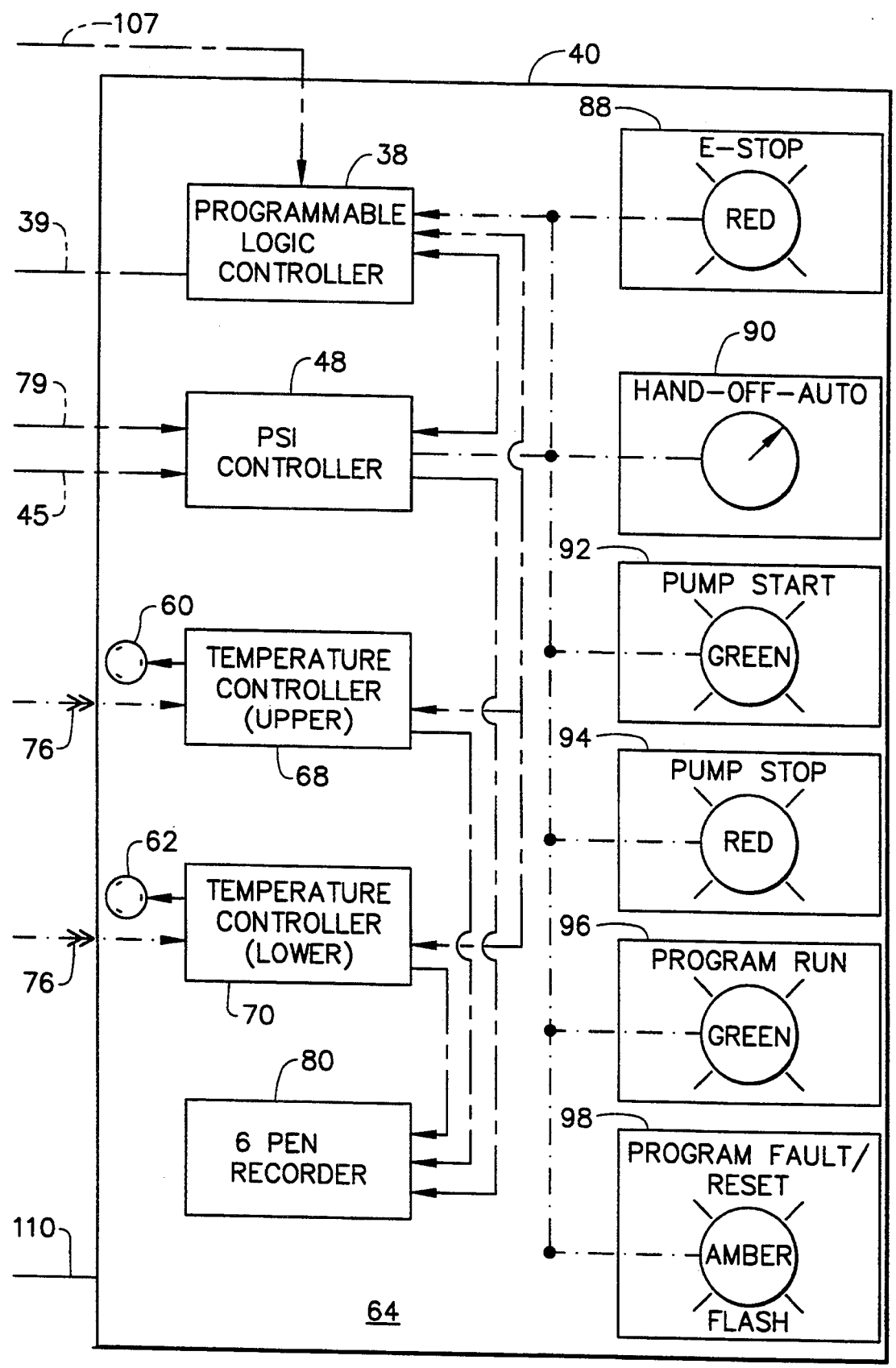

It should be noted that electrical lines or conductors are represented by chain lines in FIGS. 2A and 2B and hydraulic fluid lines or conduits are represented by solid lines.

The pressure controller 48 and the upper and lower temperature controllers 68 and 70 are each respectively electrically coupled to the programmable logic controller 38, which supervises or coordinates their operation. The pressure controller 48 is also electrically coupled to the servo pilot valve 44, as previously discussed, and to a pressure transmitter 78 by electrical conductors 79. The pressure transmitter 78 is tapped into the high pressure hydraulic line 36 which is connected to the compression side of the cylinder 16. Multiple different repair or manufacturing recipes may be stored in the programmable logic controllers 48, 68 and 70 to control the application of heat and pressure to different composite components, depending upon the particular requirements for that particular component.

A recording device 80, such as a Barber-Coleman ® Model No. Y4MP-6200-000-0-00 or the like, may also be mounted in the control cabinet 40 and electrically connected to the pressure controller 48 and the upper and lower temperature controllers 68 and 70 to provide a historical record of the temperatures and pressures applied to the workpiece 12 during a repair or fabrication operation to permit later evaluation or certification of the manufacturing or repair process. Such records for evaluation or certification may be required for some components such as those used in a gas turbine engine for aircraft propulsion.

The pressure controller 48 and the upper and lower temperature controllers 68 and 70 preferably each have respective man/machine interfaces 84, 85 and 86, including displays, associated therewith to permit real time monitoring of the planned and actual compressive force applied to the workpiece 12 and the planned and actual temperatures of the upper and lower surfaces of the workpiece 12. These displays are preferably mounted in the front panel 64 of the control cabinet 40 as shown in FIG. 1.

Also mounted in the face panel 64 are operator interface controls (FIG. 2B). A red emergency stop ("E-STOP") push button 88 is mounted in the control panel 64 and is electrically connected to the programmable logic controller 38. The controller 38 is in turn electrically connected to the three-way solenoid valve 32 for control of the solenoid valve to release the cylinder 16 and to the temperature controllers 60 and 62 to de-energize the heating elements 50 and 52 when the push button 88 is operated by an operator. A "HAND-OFF-AUTO" switch 90 may also be mounted in the front panel 64 and is coupled to the programmable logic controller 38 and the pressure controller 48 to permit manual or automatic control of a repair or manufacturing process. A "PUMP START" push button 92 and a "PUMP STOP" push button 94 are also mounted in the front panel 64 and are electrically connected to the programmable logic controller 38 and the pressure controller 48 to manually control the operation of the hydraulic pump 30. A "PROGRAM RUN" lamp 96 is also mounted in the front panel 64 to provide the status of the device and will, preferably, be illuminated when the device is in operation. A "PROGRAM FAULT/RESET" light and push button combination 98 is mounted in the front panel 64 to signal to the operator that a problem has occurred and to permit cancellation or resetting a program or automatic repair operation, if some error does arise during the processing of a workpiece.

Another control panel 100 (FIGS. 1 and 2A) is mounted to a distal end of the upper arm 14a of the C-shaped frame 14. The panel 100 also includes an emergency stop push button 102, and a "JOG" push button 104 to raise and lower the cylinder 16 in conjunction with operation of an "UP/PROGRAM START" push button 106a or a "DOWN/PROGRAM START" push button 106b also mounted in the control panel 100. One of these buttons 106a or 106b is selectively operated with the "JOG" push button 104 to move the cylinder 16 either up or down depending upon which push button, either 106a or 106b, is operated with the "JOG" button 104. The "UP/PROGRAM START" button 106a, the "JOG" button 104 and the "DOWN/PROGRAM START" button 106b are all positioned at a spacing from one another, as best shown in FIG. 1, and the "JOG" button 104 with either the "UP/PROGRAM START" button 106a or the "DOWN/PROGRAM START" button 106b, or both of the "PROGRAM START" buttons 106a and 106b together, must, preferably, be operated within 0.5 seconds of each other to move the cylinder 16 or to start a repair process; therefore, a machine operator is required to operate one button with each hand as a safety feature because of the spacing of the buttons and the timing during which they must be operated. The push buttons 102, 104, 106a and 106b are electrically coupled to the programmable logic controller 38 in the control cabinet 40 by electrical conductors 107.

Also provided is a pressure gage 108 mounted to the distal end of the upper arm 14a. The pressure gage 108 is tapped to the high pressure hydraulic line 36 which is connected to the compression side of the cylinder 16 and provides additional analog, real time monitoring of the compressive force being applied to the workpiece 12.

The control panel 40 is connected to line voltage by conductors 110 and by a disconnect switch 111. A transformer 112 may be connected in series between the disconnect switch 111 and the control panel 40 and the pump 30 to provide the appropriate voltage to each of these constituents.

Summarizing the set up and operation of the device 10, depending upon the size and shape of the workpiece 12 to be repaired or fabricated, the spacing between the upper platen 22 and the lower platen 18 may be adjusted by advancing or retarding the threaded screw 24 within the matingly threaded channel 26 formed in the upper am 14a of the C-shaped frame 14, to permit the workpiece 12 to be accommodated between the platens 18 and 22 when the lower platen 18 is in its non-operative position. After presetting the position of the upper platen 22, the workpiece 12 may be disposed between the platens and the pump 30 may be started by operating the "PUMP START" push button 92. With the switch 90 in the "HAND" position, the buttons 106a and 104 may then be depressed to gently clamp the workpiece 12 between the platens 18 and 22 at the location on the workpiece 12 to be repaired. With the switch 90 operated to the "AUTO" position, the "PROGRAM START" push buttons 106a and 106b may be depressed to begin the automatic manufacturing or repair sequence required for the particular workpiece 12 being repaired and as preprogrammed into the controllers 48, 68 and 70.

In accordance with the present invention, the compressive force may be applied to the workpiece 12 by the platens 18 and 22 according to a predetermined schedule or plan and/or as a function of the temperature of the workpiece sensed by the thermocouples 72 and 74. The programmable logic controllers 68 and 70 may be programmed to apply variable temperatures independently to the different sides of the workpiece 12 by the thermal blankets 50 and 52 and to apply these temperatures in combination with varying compressive forces as controlled by pressure controller 48.

Those skilled in the art will recognize that the device 10 may be used for all phases of the composite material repair process, including moisture removal, preparation of imidized material feedstock, if required, the repair bonding cycle and post cure, if required. The device 10, therefore, eliminates the need for different equipment to accomplish each of the supporting tasks to repair a composite component.

Additionally, while the present invention has been shown and described with respect to a vertical orientation of the cylinder 16, the equipment could equally be configured in a horizontal arrangement. Further, the hydraulic cylinder 16, could have equally been associated with the upper platen 22; however, it may be preferable that the cylinder be used in conjunction with the lower platen 18 for reasons of personnel safety and reduction of overhead hydraulic leakage which could contaminate the work area.

If required, the present invention could also be modified to provide a vacuum capability with the associated controls or the platens or anvil tools could be fitted with a jacketed fluid circulation device or similar type arrangement to provide a cooling capability.

It will be readily understood by those skilled in the art that the present invention is not limited to the specific embodiments described and illustrated herein. Different embodiments and adaptations besides those shown herein and described, as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. A device for manufacturing and repairing a workpiece made from a composite material, comprising:
   a frame having an upper member and a lower member;
   a pair of opposed platens, one coupled to each of said upper and lower frame members;
   an upper heater disposed on said upper platen and a lower heater disposed on said lower platen to apply heat to the workpiece, said upper and lower heaters each a conformal heating blanket for delivering heat up to about 900° F.;
   an upper platen temperature control circuit comprising at least one upper temperature sensor mountable to an upper surface portion of the workpiece and an upper temperature controller coupled to said upper temperature sensor and to said upper heater to control heat applied to the workpiece by said upper heater;
   a lower platen temperature control circuit comprising at least one lower temperature sensor mountable to a lower surface portion of the workpiece and a lower temperature controller coupled to said lower temperature sensor and to said lower heater to control heat applied to the workpiece by said lower heater; and
   means for moving at least one of said platens toward and away from the other platen to apply a compressive force to the workpiece disposed between said platens according to at least one of a predetermined schedule and as a function of the temperature sensed from the workpiece.

2. The device of claim 1, further comprising at least one controller to control application of pressure to the workpiece.

3. The device of claim 1, wherein said moving means comprises a hydraulic cylinder mounted to said lower frame member, a piston of said hydraulic cylinder being coupled to said lower platen and said hydraulic cylinder being driven by a pump to variably apply said compressive force to the workpiece in a range up to about 25 tons when said lower platen is extended from said lower frame member by said piston in an operative position to clamp the workpiece between said upper and lower platens.

4. The device of claim 3, further comprising means for adjusting and presetting the height of said upper platen relative to said lower platen when said lower platen is in a non-operative position at a spacing from said upper platen to permit workpieces of different sizes and shapes to be inserted between said platens before a fabrication or repair operation and to be removed from between said platens after the operation.

5. The device of claim 4, wherein said adjusting and presetting means comprises a threaded screw with one end being attached to said upper platen and with a distal end being threadedly received in a matingly threaded channel formed in said upper frame member.

6. The device of claim 1, wherein said upper and lower temperature controllers are programmed to cause said upper and lower heaters to apply heat to adjacent localized portions of the workpiece according to a predetermined schedule.

7. The device of claim 6, further comprising:
   a programmable logic controller coupled to said upper and lower temperature controllers;
   a pressure controller coupled to said programmable logic controller to automatically adjust said compressive force according to at least one of a predetermined schedule and as a function of the temperature sensed from the workpiece.

8. The device of claim 7, further comprising a recorder electrically connected to said pressure controller and said upper and lower temperature controllers to record temperatures and pressures during a manufacturing or repair process for process evaluation and certification.

9. The device of claim 1, wherein said upper temperature sensor is a first thermocouple; and further comprising a second thermocouple attached to a side of the workpiece to monitor the temperature of the workpiece; and a third thermocouple attached to another side of the workpiece to monitor the temperature of the workpiece.

10. A device for manufacturing and repairing a workpiece made from a composite material, comprising:

a substantially C-shaped frame with an upper arm and a lower arm;

an hydraulic cylinder mounted to said lower arm;

an upper platen connected to said upper arm;

a lower platen disposed opposite said upper platen and attached to a movable piston of said hydraulic cylinder to move said lower platen between a non-operative position at a spacing from said upper platen and an operative position to apply a compressive force to the workpiece in cooperation with said upper platen;

at least one heater disposed on one of said platens, said at least one heater is a conformal heating blanket for delivering heat up to about 900° F.;

at least one temperature sensor mountable to the workpiece;

at least one temperature controller coupled to said at least one heater and to said at least one temperature sensor to control heat applied to the workpiece when disposed between said platens; and at least one pressure controller operably associated with said hydraulic cylinder to control application of said compressive force.

* * * * *